US008009212B2

(12) United States Patent
Lee et al.

(10) Patent No.: US 8,009,212 B2
(45) Date of Patent: Aug. 30, 2011

(54) IMAGE PROCESSING SYSTEM WITH A 4-T PIXEL AND METHOD THEREOF CAPABLE OF REDUCING FIXED PATTERN NOISE

(75) Inventors: Yuan-Che Lee, Taichung (TW); Jhy-Jyi Sze, Tainan (TW); Chiao-Fu Chang, Taichung (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 509 days.

(21) Appl. No.: 12/237,403

(22) Filed: Sep. 25, 2008

(65) Prior Publication Data

US 2010/0073525 A1    Mar. 25, 2010

(51) Int. Cl.
*H04N 3/14* (2006.01)
*H04N 5/335* (2006.01)

(52) U.S. Cl. ........ 348/294; 348/298; 348/312; 348/314; 348/308

(58) Field of Classification Search .......... 348/294–324, 348/241, 243; 250/208.1; 257/290–292
See application file for complete search history.

(56) References Cited

U.S. PATENT DOCUMENTS

| 5,479,130 | A | 12/1995 | McCartney |
| 6,660,989 | B2 | 12/2003 | Guo et al. |
| 2006/0187329 | A1* | 8/2006 | Panicacci ............... 348/308 |
| 2007/0236590 | A1* | 10/2007 | Harris ................... 348/308 |

OTHER PUBLICATIONS

S. W. Han and E. Yoon, Electronics Letters, Mar. 16, 2006 vol. 42 No. 6, "Area-efficient correlated double sampling scheme with single sampling capacitor for CMOS image sensors".
Marc J. Loinaz et al., IEEE journal of solid-state circuits, vol. 33, No. 12, "A 200-mW, 3.3-V, CMOS color camera IC producing 352×288 24-b video at 30 frames/s", Dec. 1998.
Hsiao-Hui Tong, "Design of A Fixed Pattern Noise Reduction Circuit for CMOS Image Sensor Array", 2002, p. 1-6.

* cited by examiner

*Primary Examiner* — Yogesh K Aggarwal
(74) *Attorney, Agent, or Firm* — Winston Hsu; Scott Margo

(57) ABSTRACT

Circuitry for reducing fixed pattern noise in an image processing system with a 4-T (4 transistors) pixel and a method thereof is proposed. The image processing system includes two voltage sources, two current sources, a 4-T pixel, a second portion of a linearized source follower, a ping pong memory, a PGA, and auto-zero circuitry. By coupling the auto-zero circuitry to the PGA, an open loop is formed to clamp the output of an op amp of the PGA to a stable reference when resetting the PGA so as to remove DC offsets at the output terminal of the op amp.

18 Claims, 12 Drawing Sheets

IMAGE PROCESSING SYSTEM WITH A 4-T PIXEL AND METHOD THEREOF CAPABLE OF REDUCING FIXED PATTERN NOISE

BACKGROUND OF THE INVENTION

1. Field of the Invention

The present invention relates to an image processing system and method thereof, especially to an image processing system with a 4-T (4 transistors) pixel capable of reducing fixed pattern noise and method thereof.

2. Description of the Prior Art

Recently, CMOS image sensors (CIS) instead of CCDs (Charge-coupled devices) have become the main stream of image sensors utilized in image processing systems. The CMOS image sensors have advantages of low cost and low power consumption, and they are capable of being designed with SOC (system-on-chip) technique when compared with CCDs. As the image processing technology evolves, a 3-T (3 transistors) pixel applied in the image processing systems is gradually replaced by a 4-T (4 transistors) pixel due to better performance and efficiency.

However, the CMOS image sensors have fixed pattern noises (FPN) caused by the differences between the parameters of the device. Please refer to FIG. 1. FIG. 1 is an image with FPN equal to 2.41%. Generally, an image sensor can be divided into 2 portions, the photo detector array and the readout circuitry. The FPN in the CIS system may be induced by pixels and by the readout circuitry. The FPN induced by pixels is normally due to the mismatches of the pixel dark current and the source follower in the pixel array, and the FPN induced by the readout circuitry is due to the readout architecture and certain offsets. The most serious FPN in the CIS system is the FPN induced by the readout circuitry. Generally speaking, the FPN in the readout circuitry can be divided into 5 categories:

(1) FPN_1: pixel FPN (too small to be considered).
(2) FPN_2: random offsets between even/odd neighboring columns.
(3) FPN_3: offsets between even and odd columns.
(2) FPN_4: gradually decreased outputs in even/odd columns.
(5) FPN_5: offsets between top and bottom readout rows.

Please refer to FIG. 2. FIG. 2 is an image illustrating the 5 categories of FPN in the readout circuitry. In FIG. 2, "e" denotes an even column; "o" denotes an odd column; "TOP" denotes a row for top readout; "Bottom" denotes a row for bottom readout. An image of high quality should have overall FPN kept under 1%. The effective technique used to reduce FPN is correlated double sampling (CDS). However, the CDS is very complicated.

Please refer to FIG. 3. FIG. 3 shows a block diagram of the prior art image process system 400. The image process system 400 includes a 4-T pixel 1000, a second portion 1600 of a linearized source follower, a ping pong memory 2000, and a PGA (programmable gain amplifier) 250. The 4-T pixel 1000 includes a first portion of a linearized source follower. The second portion 1600 of the linearized source follower is coupled between the 4-T pixel 1000 and the ping pong memory 2000. The ping pong memory 2000 is coupled between the second portion 1600 of the linearized source follower and the PGA 250. The PGA 250 includes an op amp, and the PGA 250 is a close loop. Thus, an unwanted offset voltage at the output of the op amp will be feed backed to an input of the PGA 250 and thereby generate FPN of more than 1%, which is an unacceptable level.

SUMMARY OF THE INVENTION

An embodiment of the present invention discloses an image processing system including a photodiode, a 4-T (4-transistor) pixel, a second portion of a linearized source follower, a ping pong memory, a PGA (programmable gain amplifier), and auto-zero circuitry. The photodiode is for generating data according to received light. The 4-T pixel coupled to the photodiode for transferring the data received from the photodiode includes a first portion of the linearized source follower. The second portion of the linearized source follower is coupled to the first portion of the linearized source follower. The ping pong memory is coupled to an output terminal of the second portion of the linearized source follower for transferring the data received from the photodiode through the 4-T pixel. The PGA is coupled to an output terminal of the ping pong memory for amplifying the data transferred from the output terminal of the ping pong memory. The auto-zero circuitry is coupled to the PGA for eliminating a dc offset and noise of the PGA.

Another embodiment of the present invention discloses an image processing method comprising resetting a 4-T pixel and a first portion of a ping pong memory; writing data from a photodiode to the first portion of the ping pong memory through the 4-T pixel; auto-zero circuitry resetting an output of a PGA (programmable gain amplifier) to generate a stable reference; and writing the data from the first portion of the ping pong memory to the PGA.

Another embodiment of the present invention further discloses an image processing method comprising switching on a first switch of a first portion of a ping pong memory; changing a first reset signal from a first potential to a second potential to switch on a reset switch of a 4-T pixel; after the first switch of the first portion of the ping pong memory and the reset switch of the 4-T pixel are switched on, switching on a second switch of the first portion of the ping pong memory; after the second switch of the first portion of the ping pong memory is switched on, changing the first reset signal from the second potential to the first potential to switch off the reset switch of the 4-T pixel; after the reset switch of the 4-T pixel is switched off, switching off the second switch of the first portion of the ping pong memory; changing a first transferring signal from the first potential to the second potential to switch on a transmission switch of the 4-T pixel so as to start a data-writing process from the 4-T pixel to the first portion of the ping pong memory; after performing the data-writing process from the 4-T pixel to the first portion of the ping pong memory, changing the first transferring signal from the second potential to the first potential to switch off the transmission switch of the 4-T pixel, and switching off the first switch of the first portion of the ping pong memory; after switching off the first switch of the first portion of the ping pong memory, switching on a third switch of the first portion of the ping pong memory; switching on a first selection switch and a second selection switch of a PGA; after the first selection switch and the second selection switch of the PGA are switched on, changing a second reset signal from the first potential to the second potential to switch on first and second reset switches of auto-zero circuitry, and third and fourth reset switches of the PGA to reset the PGA and the auto-zero circuitry; after the PGA and the auto-zero circuitry are reset, changing the second reset signal from the second potential to the first potential to switch off the first and second reset switches of the auto-zero circuitry, and the third and fourth reset switches of the PGA; after the first and second reset switches of the auto-zero circuitry, and the third and fourth reset switches of the PGA are switched off, changing a second transferring signal from the first potential to the second potential to switch on a first transmission switch of the PGA, and second and third transmission switches of the auto-zero circuitry so as to start a data-writing process from the first portion of the ping pong memory to the PGA; after performing the data-writing process from the first portion of the ping pong memory to the PGA, changing the second transferring signal from the second potential to the first potential to switch off the first transmission switch of the PGA, and the second and third transmission switches of the auto-zero circuitry; and after the first transmission switch of the PGA, and the second and third transmission switches of the auto-zero circuitry are switched off, switching off the first and second selection switches of the PGA.

These and other objectives of the present invention will no doubt become obvious to those of ordinary skill in the art after reading the following detailed description of the preferred embodiment that is illustrated in the various figures and drawings.

DETAILED DESCRIPTION

Aimed at the defects of the prior art, the present invention utilizes the auto-zero circuitry to remove dc offsets by clamping the output voltage of the op amp of each pixel to a stable reference so as to prevent generation of FPN.

Figure 4:
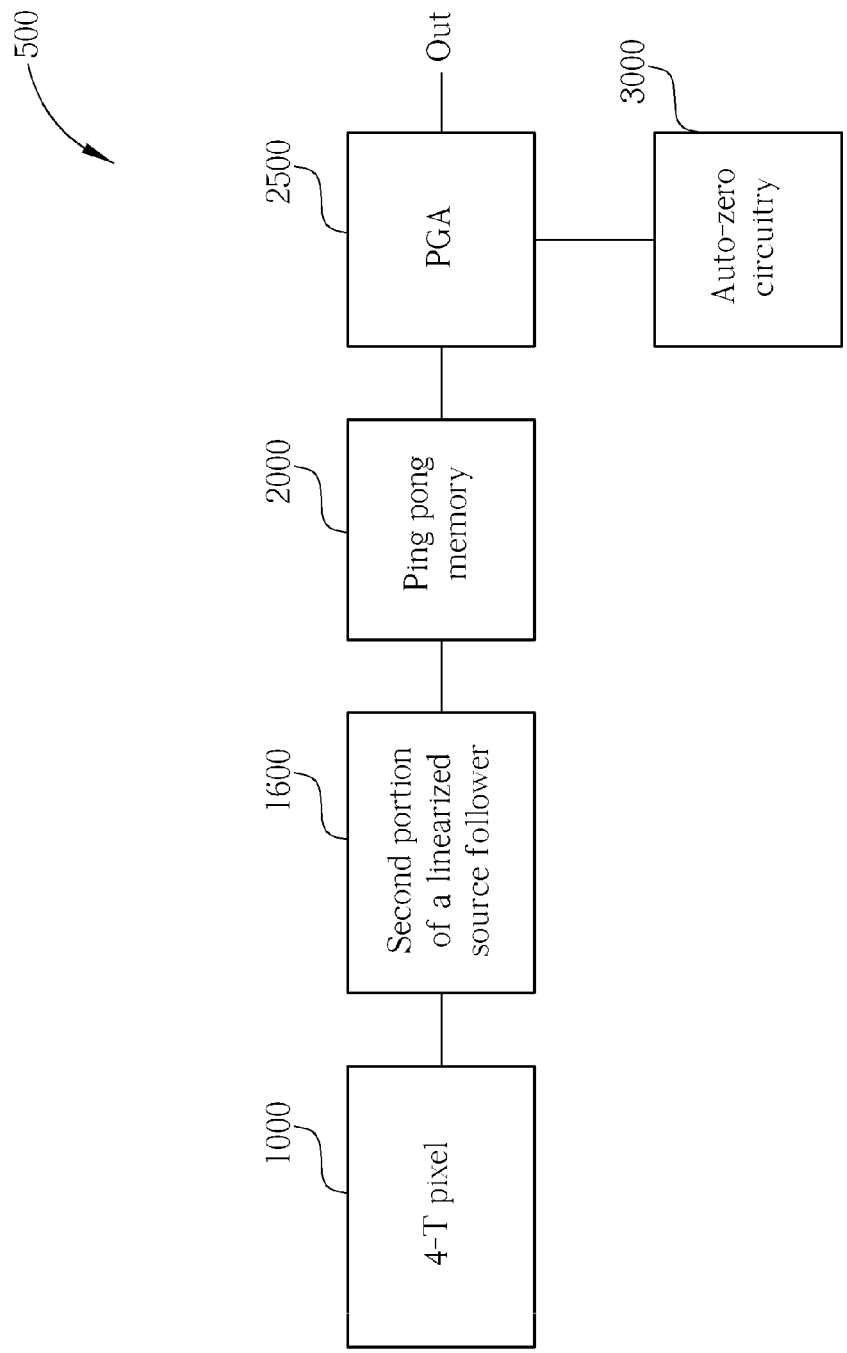
FIG. 4 is a block diagram of an image processing system according to the embodiment of the present invention.

Please refer to FIG. 4. FIG. 4 is a block diagram of an image processing system 500 according to an embodiment of the present invention. The image processing system 500 comprises a 4-T (4-transistor) pixel 1000 of a CMOS image sensor array. The 4-T pixel 1000 includes a first portion of a linearized source follower. The image processing system 500 further comprises a second portion 1600 of the linearized source follower, a ping pong memory 2000, a PGA 2500, and auto-zero circuitry 3000. The second portion 1600 of the linearized source follower is coupled between the 4-T pixel 1000 and the ping pong memory 2000. The ping pong memory 2000 is coupled between the second portion 1600 of the linearized source follower and the PGA 2500. And the auto-zero circuitry 3000 is coupled to the PGA 2500.

Figure 5:
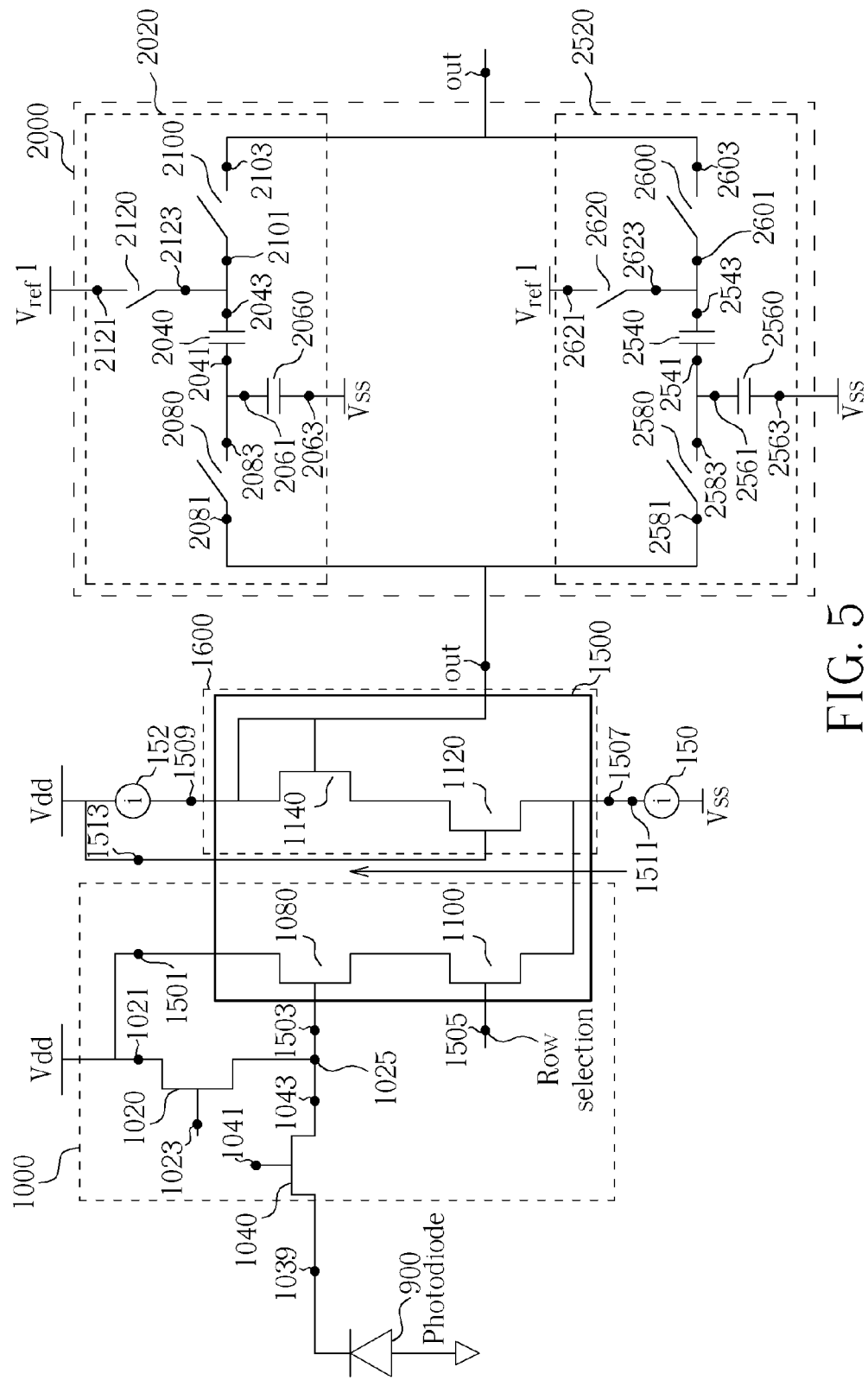
FIG. 5 is a schematic diagram of the 4-T pixel, the second portion of the linearized source follower, and the ping pong memory.

Please refer to FIG. 5. FIG. 5 is a schematic diagram of the 4-T pixel 1000, the second portion 1600 of the linearized source follower 1500, and the ping pong memory 2000. The 4-T pixel 1000 comprises a reset switch 1020, a transmission switch 1040, and a first portion of the linearized source follower 1500. The reset switch 1020 includes a first terminal 1021 coupled to a Vdd voltage source, a second terminal 1023 for receiving a reset signal, and a third terminal 1025. The transmission switch 1040 includes a first terminal 1039 coupled to a photodiode 900, a second terminal 1041 for receiving a transferring signal, and a third terminal 1043 coupled to the third terminal 1025 of the reset switch 1020. The first portion of the linearized source follower 1500 includes two transistors 1080 and 1100 connected in series. The transistor 1080 is a source follower, and the transistor 1100 is a row-selection switch. The transistor 1080 includes a first terminal 1501 coupled to the first terminal 1021 of the reset switch 1020, a second terminal 1503 coupled to the third terminal 1025 of the reset switch 1020, and a third terminal. The transistor 1100 includes a first terminal coupled to the third terminal of the transistor 1080, a second terminal 1505 for row selection, and a third terminal 1507 coupled to a current source 150. The second portion 1600 of the linearized source follower 1500 includes two transistors 1120, and 1140 connected in series. The transistor 1140 includes a first terminal 1509 coupled to a current source 152, a second terminal coupled to the first terminal 1509 of the transistor 1140 and the output terminal of the second portion 1600 of the linearized source follower 1500, and a third terminal. The transistor 1120 includes a first terminal coupled to the third terminal of the transistor 1140, a second terminal 1513 coupled to the Vdd voltage source, and a third terminal 1511 coupled to the third terminal 1507 of the transistor 1100. The current source 152 includes a terminal coupled to the Vdd voltage source, and the current source 150 includes a terminal coupled to a Vss voltage source.

The ping pong memory 2000 includes a first portion 2020 and a second portion 2520. The first portion 2020 includes first and second capacitors 2040 and 2060, and first, second, and third switches 2080, 2120, and 2100. The second capacitor 2060 includes a first terminal 2061 and a second terminal 2063 coupled to the Vss voltage source. The first capacitor 2040 includes a first terminal 2041 coupled to the first terminal 2061 of the second capacitor 2060, and a second terminal 2043. The first switch 2080 includes a first terminal 2081 coupled to the output terminal of the second portion 1600 of the linearized source follower 1500, and a second terminal 2083 coupled to the first terminal 2061 of the second capacitor 2060. The second switch 2120 includes a first terminal 2121 coupled to a first reference voltage source Vref1, and a second terminal 2123 coupled to the second terminal 2043 of the first capacitor 2040. The third switch 2100 includes a first terminal 2101 coupled to the second terminal 2043 of the first capacitor 2040, and a second terminal 2103 coupled to an output terminal of the ping pong memory 2000. The second portion 2520 of the ping pong memory 2000 includes third and fourth capacitors 2540 and 2560, and fourth, fifth, and sixth switches 2580, 2620, and 2600. The fourth capacitor 2560 includes a first terminal 2561 and a second terminal 2563 coupled to the Vss voltage source. The third capacitor 2540 includes a first terminal 2541 coupled to the first terminal 2561 of the fourth capacitor 2560, and a second terminal 2543. The fourth switch 2580 includes a first terminal 2581 coupled to the output terminal of the second portion 1600 of the linearized source follower 1500, and a second terminal 2583 coupled to the first terminal 2561 of the fourth capacitor 2560. The fifth switch 2620 includes a first terminal 2621 coupled to the first reference voltage source Vref1, and a second terminal 2623 coupled to the second terminal 2543 of the capacitor third 2540. The sixth switch 2600 includes a first terminal 2601 coupled to the second terminal 2543 of the third capacitor 2540, and a second terminal 2603 coupled to the output terminal of the ping pong memory 2000.

Figure 6:
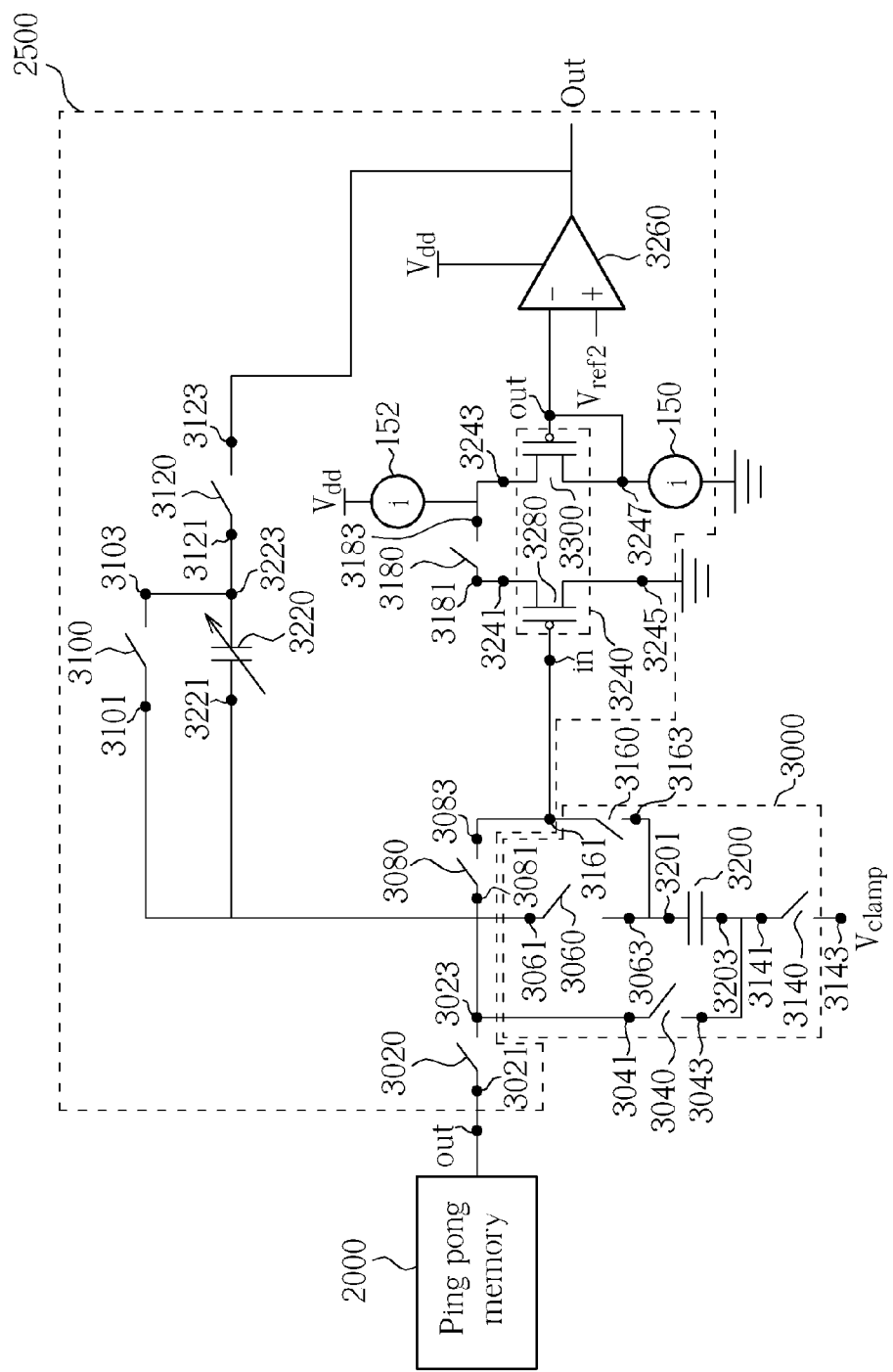
FIG. 6 is a schematic diagram of the PGA and the auto-zero circuitry.

Please refer to FIG. 6. FIG. 6 is a schematic diagram of the PGA 2500 and the auto-zero circuitry 3000. The PGA 2500 includes first and second selection switches 3120 and 3180, a variable capacitor 3220, an operational amplifier (op amp) 3260, a first transmission switch 3020, third and fourth reset switches 3080 and 3100, and a voltage mirror device 3240. The first transmission switch 3020 includes a first terminal 3021 coupled to the output terminal of the ping pong memory 2000, and a second terminal 3023. The fourth reset switch 3100 includes a first terminal 3101 coupled to the second terminal 3023 of the first transmission switch 3020, and a second terminal 3103. The variable capacitor 3220, connected to the fourth reset switch 3100 in parallel, includes a first terminal 3221 coupled to the second terminal 3023 of the first transmission switch 3020, and a second terminal 3223 coupled to the second terminal 3103 of the fourth reset switch 3100. The first selection switch 3120 includes a first terminal 3121 coupled to the second terminal 3223 of the variable capacitor 3220, and a second terminal 3123. The op amp 3260 includes an inverting input, a non-inverting input coupled to a second reference voltage source Vref2, an output terminal coupled to the second terminal 3123 of the first selection switch 3120, and a positive power terminal coupled to the Vdd voltage source. The voltage mirror device 3240 includes 2 PMOS transistors 3280 and 3300, first, second, third, fourth, input, and output terminals. A first terminal 3241 of the voltage mirror device 3240 is the source terminal of the PMOS transistor 3280. A second terminal 3243 of the voltage mirror device 3240, being the source terminal of the PMOS transistor 3300, is coupled to the current source 152. An input terminal of the voltage mirror device 3240 is the gate terminal of the PMOS transistor 3280. An output terminal of the voltage mirror device 3240, being the gate terminal of the PMOS transistor 3300, is coupled to the inverting input of the op amp 3260. A third terminal 3245 of the voltage mirror device 3240, being the drain terminal of the PMOS transistor 3280, is coupled to the Vss voltage source. A fourth terminal 3247 of the voltage mirror device 3240, being the drain terminal of the PMOS transistor 3300, is coupled to the current source 150 and the output terminal of the voltage mirror device 3240. The second selection switch 3180 includes a first terminal 3181 coupled to the first terminal 3241 of the voltage mirror device 3240, and a second terminal 3183 coupled to the second terminal 3243 of the voltage mirror device 3240. The third reset switch 3080 includes a first terminal 3081 coupled to the second terminal 3023 of the first transmission switch 3020, and a second terminal 3083 coupled to the input terminal of the voltage mirror device 3240. Please note that the third reset switch 3080 does not exist in the traditional PGA of the pixel array of an LCD panel. When the third reset switch 3080 is switched on, data is transferred from the ping pong memory 2000 to the PGA 2500; and when the third reset switch 3080 is switched off, the dc offset and noise can be isolated from the op amp 3260 of the PGA 2500. By controlling the third reset switch 3080, an accurate reference can be generated at the output terminal of the op amp 3260 of the PGA 2500 due to the dc offset isolation.

The auto-zero circuitry 3000 includes second and third transmission switches 3040, and 3160, and first and second reset switches 3060 and 3140, and an auto-zero capacitor 3200. The second transmission switch 3040 includes a first terminal 3041 coupled to the second terminal 3023 of the first transmission switch 3020, and a second terminal 3043. The first reset switch 3060 includes a first terminal 3061 coupled to the second terminal 3023 of the first transmission switch 3020, and a second terminal 3063. The second reset switch 3140 includes a first terminal 3141 coupled to the second terminal 3043 of the second transmission switch 3040, and a second terminal 3143 coupled to a Vclamp voltage source. The third transmission switch 3160 includes a first terminal 3161 coupled to the second terminal 3083 of the third reset switch 3080, and a second terminal 3163 coupled to the second terminal 3063 of the first reset switch 3060. The auto-zero capacitor 3200 includes a first terminal 3201 coupled to the second terminal 3063 of the first reset switch 3060, and a second terminal 3203 coupled to the second terminal 3043 of the second transmission switch 3040.

The ping pong memory 2000, first, second and third transmission switches 3020, 3040, and 3160, first, second, third and fourth reset switches 3060, 3140, 3080 and 3100, first and second selection switches 3120 and 3180, an auto-zero capacitor 3200, a variable capacitor 3220, and the PMOS transistor 3280 of the voltage mirror device 3240 form column-level circuitry, which appears in each column of the pixel array in an LCD panel.

Figure 7:
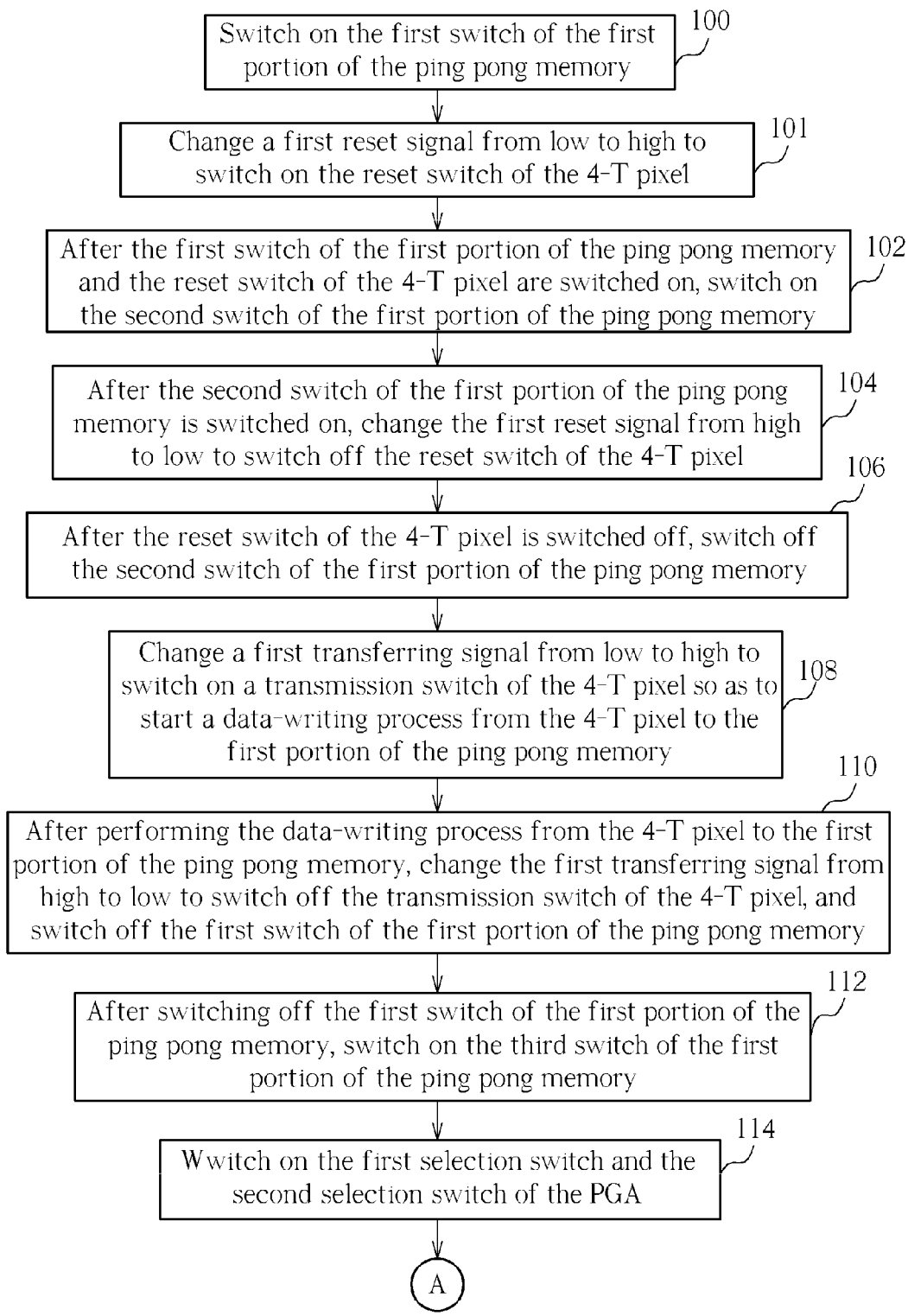
FIG. 7 and FIG. 8 form a flow chart of the method of reducing fixed pattern noise for the image processing system according the present invention.
Figure 8:
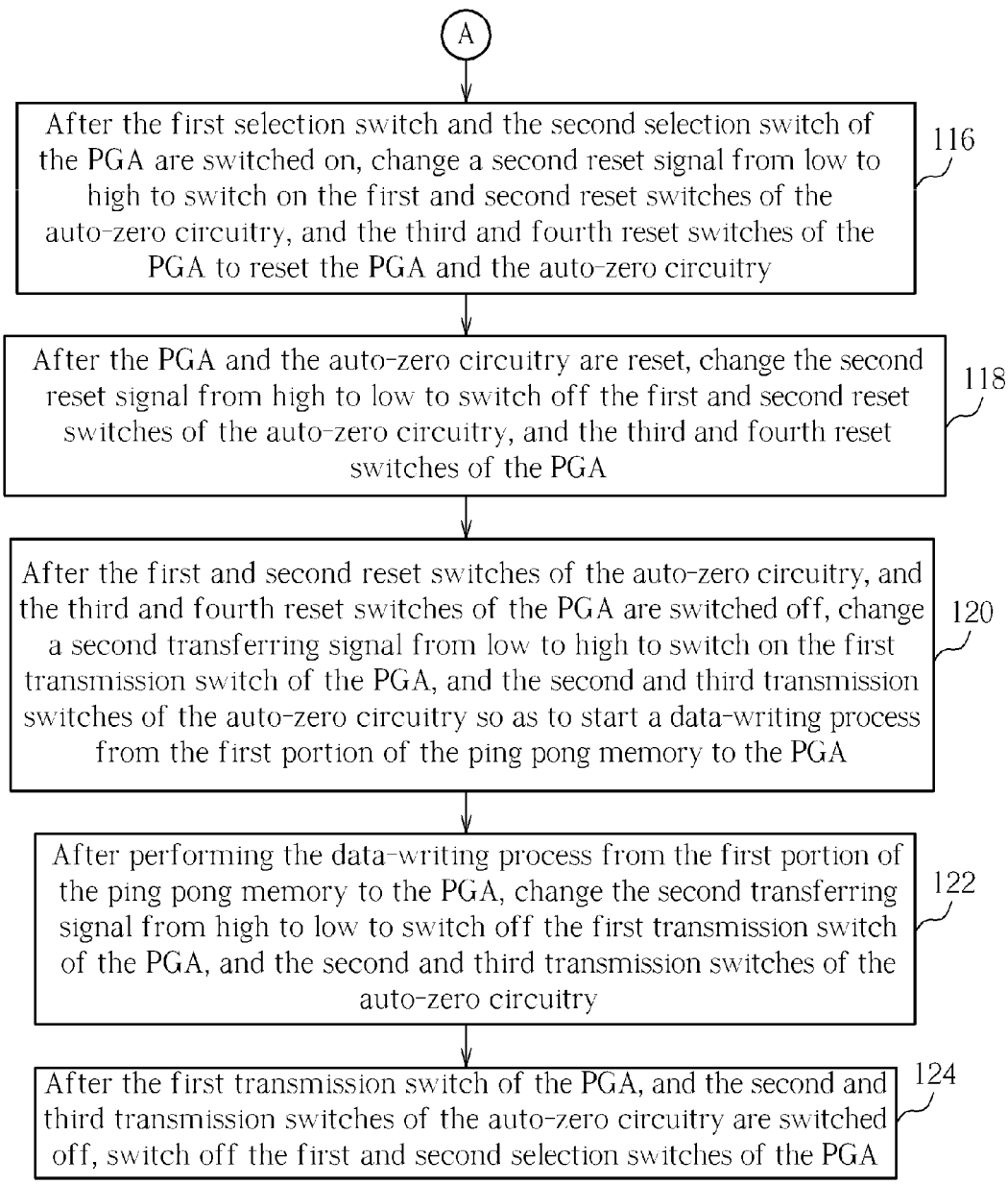

Please refer to FIG. 7 and FIG. 8. FIG. 7 and FIG. 8 form a flow chart of the method of reducing fixed pattern noise for the image processing system 500 according the present invention. The steps in FIG. 7 and FIG. 8 include:

Step 100: switch on the first switch 2080 of the first portion 2020 of the ping pong memory 2000;

Step 101: change a first reset signal from a low potential to a high potential to switch on the reset switch 1020 of the 4-T pixel 1000;

Step 102: after the first switch 2080 of the first portion 2020 of the ping pong memory 2000 and the reset switch 1020 of the 4-T pixel 1000 are switched on, switch on the second switch 2120 of the first portion 2020 of the ping pong memory 2000;

Step 104: after the second switch 2120 of the first portion 2020 of the ping pong memory 2000 is switched on, change the first reset signal from the high potential to the low potential to switch off the reset switch 1020 of the 4-T pixel 1000;

Step 106: after the reset switch 1020 of the 4-T pixel 1000 is switched off, switch off the second switch 2120 of the first portion 2020 of the ping pong memory 2000;

Step 108: change a first transferring signal from the low potential to the high potential to switch on a transmission switch 1040 of the 4-T pixel 1000 so as to start a data-writing process from the 4-T pixel 1000 to the first portion 2020 of the ping pong memory 2000;

Step 110: after performing the data-writing process from the 4-T pixel 1000 to the first portion 2020 of the ping pong memory 2000, change the first transferring signal from the high potential to the low potential to switch off the transmission switch 1040 of the 4-T pixel 1000, and switch off the first switch 2080 of the first portion 2020 of the ping pong memory 2000;

Step 112: after switching off the first switch 2080 of the first portion 2020 of the ping pong memory 2000, switch on the third switch 2100 of the first portion 2020 of the ping pong memory 2000;

Step 114: switch on the first selection switch 3120 and the second selection switch 3180 of the PGA 2500;

Step 116: after the first selection switch 3120 and the second selection switch 3180 of the PGA 2500 are switched on, change a second reset signal from the low potential to the high potential to switch on the first and second reset switches 3060 and 3140 of the auto-zero circuitry 3000, and the third and fourth reset switches 3080 and 3100 of the PGA 2500 to reset the PGA 2500 and the auto-zero circuitry 3000;

Step 118: after the PGA 2500 and the auto-zero circuitry 3000 are reset, change the second reset signal from the high potential to the low potential to switch off the first and second reset switches 3060 and 3140 of the auto-zero circuitry 3000, and the third and fourth reset switches 3080 and 3100 of the PGA 2500;

Step 120: after the first and second reset switches 3060 and 3140 of the auto-zero circuitry 3000, and the third and fourth reset switches 3080 and 3100 of the PGA 2500 are switched off, change a second transferring signal from the low potential to the high potential to switch on the first transmission switch 3020 of the PGA 2500, and the second and third transmission switches 3040 and 3160 of the auto-zero circuitry 3000 so as to start a data-writing process from the first portion 2020 of the ping pong memory 2000 to the PGA 2500;

Step 122: after performing the data-writing process from the first portion 2020 of the ping pong memory 2000 to the PGA 2500, change the second transferring signal from the high potential to the low potential to switch off the first transmission switch 3020 of the PGA 2500, and the second and third transmission switches 3040 and 3160 of the auto-zero circuitry 3000;

Step 124: after the first transmission switch 3020 of the PGA 2500, and the second and third transmission switches 3040 and 3160 of the auto-zero circuitry 3000 are switched off, switch off the first and second selection switches 3120 and 3180 of the PGA 2500.

The general idea of the method of reducing fixed pattern noise for the image processing system 500 according the present invention can be concluded in the following steps: resetting the 4-T pixel 1000 and the first portion 2020 of the ping pong memory 2000; writing data from a photodiode to the first portion 2020 of the ping pong memory 2000 through the 4-T pixel 1000; the auto-zero circuitry 3000 resetting the output of the PGA 1500 to generate a stable reference; and writing the data from the first portion 2020 of the ping pong memory 2000 to the PGA 2500. Writing the data from the photodiode to the first portion 2020 of the ping pong memory 2000 through the 4-T pixel 1000 is performed after the 4-T pixel 1000 and the first portion 2020 of the ping pong memory 2000 are reset. The auto-zero circuitry 3000 resetting the output of the PGA 2500 to generate the stable reference is performed after the data from the photodiode is written to the first portion 2020 of the ping pong memory 2000. And writing the data from the first portion 2020 of the ping pong memory 2000 to the PGA 2500 is performed after the output of the PGA 2500 is reset. Moreover, select the PGA 2500 when the auto-zero circuitry 3000 resets the output of the PGA 2500 to generate the stable reference and writes the data from the first portion 2020 of the ping pong memory 2000 to the PGA 2500.

Resetting the 4-T pixel 1000 and the first portion 2020 of the ping pong memory 2000 comprises steps 100, 101, 102, 104, and 106 in FIG. 7 and FIG. 8: switching on the first switch 2080 of the first portion 2020 of the ping pong memory 2000; changing a first reset signal from a low potential to a high potential to switch on the reset switch 1020 of the 4-T pixel 1000; after the first switch 2080 of the first portion 2020 of the ping pong memory 2000 and the reset switch 1020 of the 4-T pixel 1000 are switched on, switching on the second switch 2120 of the first portion 2020 of the ping pong memory 2000; after the second switch 2120 of the first portion 2020 of the ping pong memory 2000 is switched on, changing the first reset signal from the high potential to the low potential to switch off the reset switch 1020 of the 4-T pixel 1000; after the reset switch 1020 of the 4-T pixel 1000 is switched off, switching off the second switch 2120 of the first portion 2020 of the ping pong memory 2000.

Writing the data from the photodiode to the first portion 2020 of the ping pong memory 2000 through the 4-T pixel 1000 comprises steps 108, 110, and 112 in FIG. 7 and FIG. 8: changing a first transferring signal from the low potential to the high potential to switch on a transmission switch 1040 of the 4-T pixel 1000 so as to start a data-writing process from the 4-T pixel 1000 to the first portion 2020 of the ping pong memory 2000; after performing the data-writing process from the 4-T pixel 1000 to the first portion 2020 of the ping pong memory 2000, changing the first transferring signal from the high potential to the low potential to switch off the transmission switch 1040 of the 4-T pixel 1000, and switching off the first switch 2080 of the first portion 2020 of the ping pong memory 2000; after switching off the first switch 2080 of the first portion 2020 of the ping pong memory 2000, switching on the third switch 2100 of the first portion 2020 of the ping pong memory 2000.

The auto-zero circuitry 3000 resetting the output of the PGA 2500 to generate the stable reference comprises steps 116 and 118 in FIG. 7 and FIG. 8: changing a second reset signal from the low potential to the high potential to switch on the first and second reset switches 3060 and 3140 of the auto-zero circuitry 3000, and the third and fourth reset switches 3080 and 3100 of the PGA 2500 to reset the PGA 2500 and the auto-zero circuitry 3000; after the PGA 2500 and the auto-zero circuitry 3000 are reset, changing the second reset signal from the high potential to the low potential to switch off the first and second reset switches 3060 and 3140 of the auto-zero circuitry 3000, and the third and fourth reset switches 3080 and 3100 of the PGA 2500.

Writing the data from the first portion 2020 of the ping pong memory 2000 to the PGA 2500 comprises steps 120 and 122 in FIG. 7 and FIG. 8: after the first and second reset switches 3060 and 3140 of the auto-zero circuitry 3000, and the third and fourth reset switches 3080 and 3100 of the PGA 2500 are switched off, changing a second transferring signal from the low potential to the high potential to switch on the first transmission switch 3020 of the PGA 2500, and the second and third transmission switches 3040 and 3160 of the auto-zero circuitry 3000 so as to start a data-writing process from the first portion 2020 of the ping pong memory 2000 to the PGA 2500; after performing the data-writing process from the first portion 2020 of the ping pong memory 2000 to the PGA 2500, changing the second transferring signal from the high potential to the low potential to switch off the first transmission switch 3020 of the PGA 2500, and the second and third transmission switches 3040 and 3160 of the auto-zero circuitry 3000.

Moreover, selecting the PGA 2500 when the auto-zero circuitry 3000 resets the output of the PGA 2500 to generate the stable reference and writes the data from the first portion 2020 of the ping pong memory 2000 to the PGA 2500 includes steps 114 and 124 in FIG. 7 and FIG. 8: switching on the first selection switch 3120 and the second selection switch 3180 of the PGA 2500 before the first and second reset switches 3060 and 3140 of the auto-zero circuitry 3000, and the third and fourth reset switches 3080 and 3100 of the PGA 2500 are switched on; and after the first transmission switch 3020 of the PGA 2500, and the second and third transmission switches 3040 and 3160 of the auto-zero circuitry 3000 are switched off, switching off the first and second selection switches 3120 and 3180 of the PGA 2500.

Figure 9:
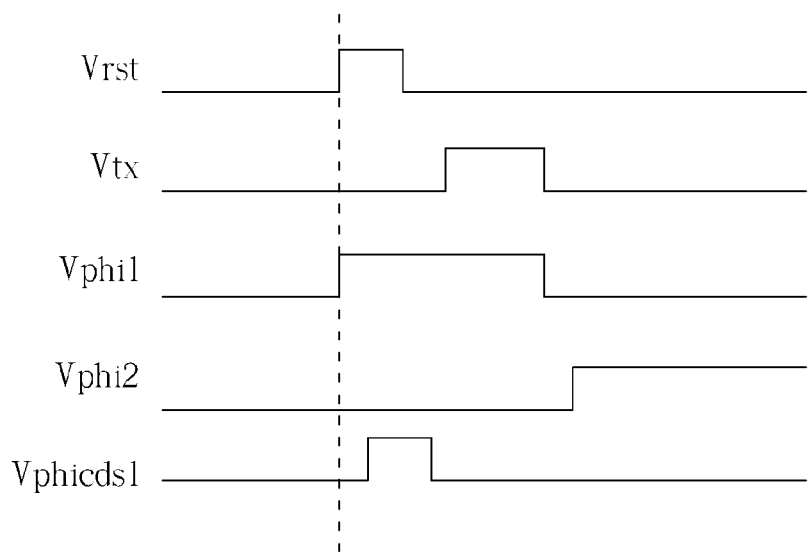
FIG. 9 is a timing diagram of the 4-T pixel, the second portion of the linearized source follower, and the ping pong memory.

Please refer to FIG. 9. FIG. 9 is a timing diagram of the 4-T pixel 1000 and the first portion 2020 of the ping pong memory 2000. In FIG. 9, "Vrst" is the control signal of the reset switch 1020 of the 4-T pixel 1000, "Vtx" is the control signal of the transmission switch 1040 of the 4-T pixel 1000, "Vphicds1" is the control signal of the second switch 2120 of the first portion 2020 of the ping pong memory 2000, "Vphi1" is the control signal of the first switch 2080 of the first portion 2020 of the ping pong memory 2000, and "Vphi2" is the control signal of the third switch 2100 of the first portion 2020 of the ping pong memory 2000. When "Vrst" is high, the 4-T pixel 1000 is reset. And voltages "Vfd", "Vshm", and "Vsh" at the third terminal 1025 of the reset switch 1020 of the 4-T pixel 1000, the second terminal 2083 of the first switch 2080 of the first portion 2020 of the ping pong memory 2000, and the second terminal 2043 of the first capacitor 2040 of the first portion 2020 of the ping pong memory 2000 are induced to "reset Vfd", "reset Vshm", and "reset Vsh" respectively, where "reset Vsh" equals to the first reference voltage Vref1. When "Vtx" is high, data is transmitted from the 4-T pixel 1000 to the first portion 2020 of the ping pong memory 2000. And the first and second capacitors 2040 and 2060 of the first portion 2020 of the ping pong memory 2000 begin to store the voltage difference induced by the first reset and first transferring signals. When transferring, "Vshm" equals to "reset Vshm" plus "Vfd" minus "reset Vfd" (Vshm=reset Vshm+ Vfd−reset Vfd). "Vsh" equals to the first reference voltage Vref1 plus "Vfd" minus "reset Vfd" (Vsh=Vref1+Vfd−reset Vfd). When "Vphi1" is high, the reset of the 4-T pixel 1000 and transmission of data from the 4-T pixel 1000 to the first portion 2020 of the ping pong memory 2000 can be performed. "Vphi2" becomes high after "Vphi1" changes to low so that data transmitted to the first portion 2020 of the ping pong memory 2000 can be sent to the PGA 2500.

Figure 10:
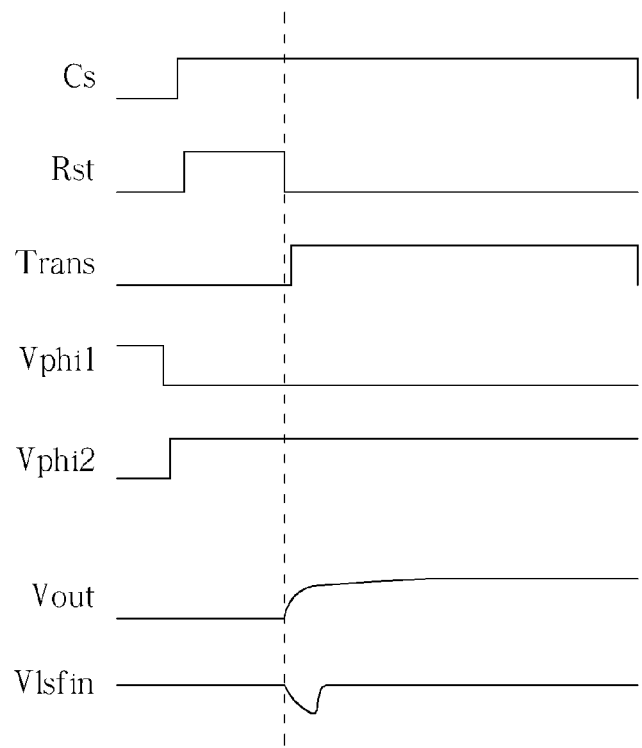
FIG. 10 is a timing diagram of the ping pong memory, the PGA, and the auto-zero circuitry.

Please refer to FIG. 10. FIG. 10 is a timing diagram of the ping pong memory 2000, the PGA 2500, and the auto-zero circuitry 3000. In FIG. 10, "Cs" is the control signal for column-selecting given on the first and second selection switches 3120 and 3180 of the PGA 2500, "Rst" is the control signal of the first and second reset switches 3060 and 3140 of the auto-zero circuitry 3000, and the third and fourth reset switches 3080 and 3100 of the PGA 2500. "Trans" is the control signal of the first transmission switch 3020 of the PGA 2500, and the second and third transmission switches 3040 and 3160 of the auto-zero circuitry 3000. "Vlsfin" represents the voltage at the second terminal 3023 of the first transmission switch 3020 of the PGA 2500, "Vout" represents the voltage at the output terminal of the op amp 3260 of the PGA 2500. "Vphi1" and "Vphi2" are the same as those shown in FIG. 9. When "Cs" is high, the reset of both the PGA 2500 and the auto-zero circuitry 3000 and transmission of data from the first portion 2020 of the ping pong memory 2000 to the PGA 2500 can be performed. When "Rst" is high, the PGA 2500 and the auto-zero circuitry 3000 are reset to generate a stable reference at an output terminal of an op amp 3260 of the PGA 2500. When "Trans" is high, data is transmitted from the first portion 2020 of the ping pong memory 2000 to the PGA 2500. When transferring, the voltage induced at the output terminal of the op amp equals to:

$$Vout = Vlsfin + C1/(2*C2) * \{Vlsfin - [Vref1 + (Vfd - resetVfd)]\} \quad \text{Formula 1}$$

$$\Delta Vout = (1 + C1/(2*C2)) * \Delta Vlsfin \quad \text{Formula 2}$$

Wherein C1 is the capacitance of the capacitor 2040 and 2060;

C2 is the capacitance of the capacitor 3220.

Figure 1:
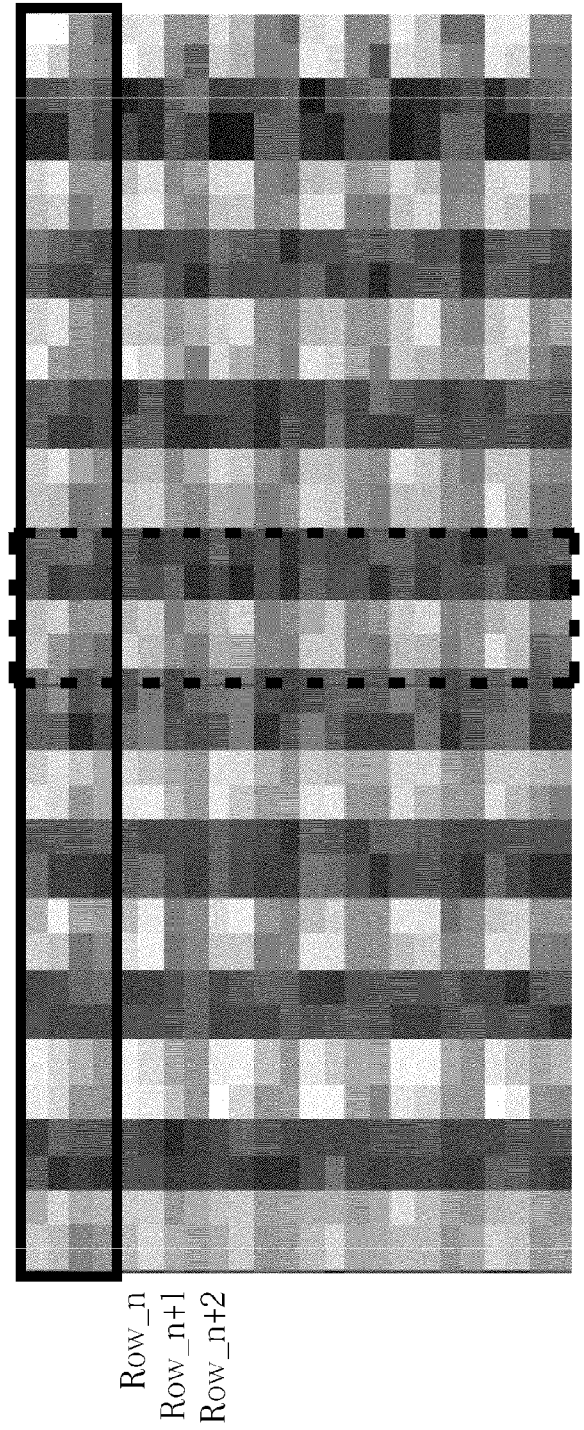
FIG. 1 is an image with FPN equal to 2.41%.
Figure 2:
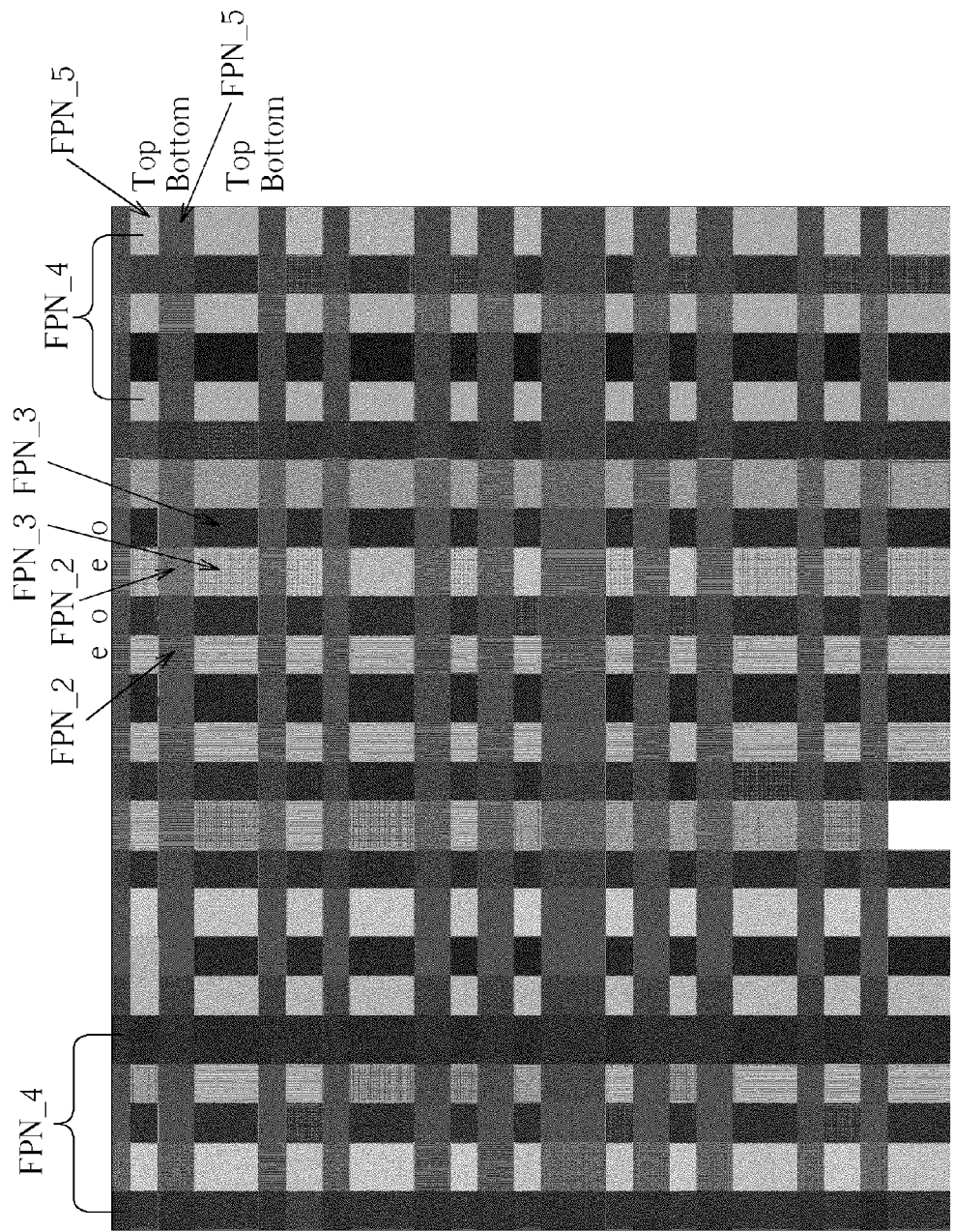
FIG. 2 is an image for illustrating 5 categories of FPN.
Figure 3:
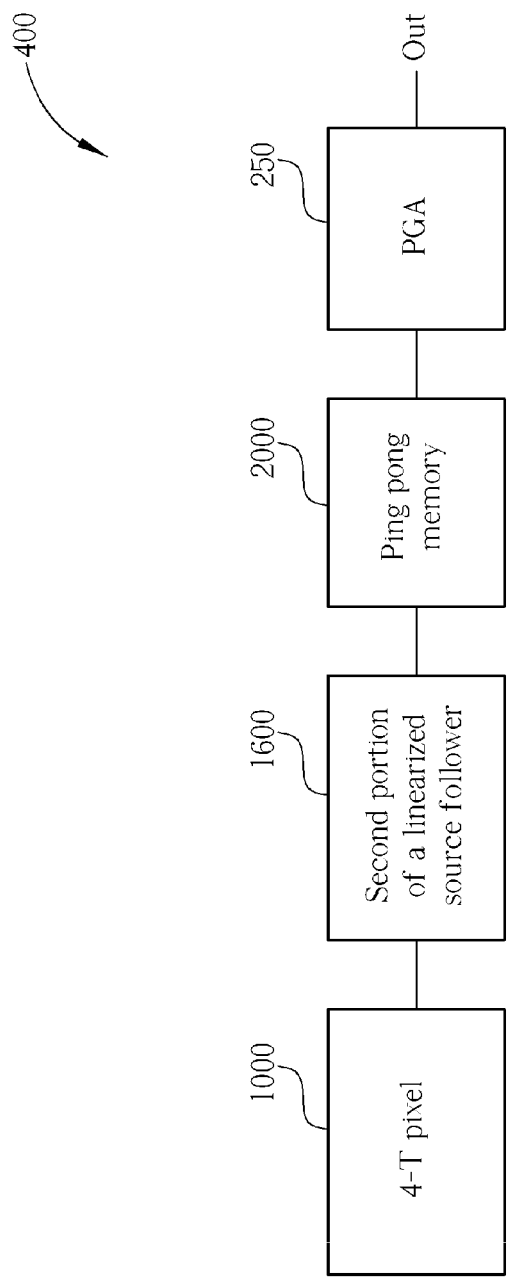
FIG. 3 shows a block diagram of the prior art image process system.
Figure 11:
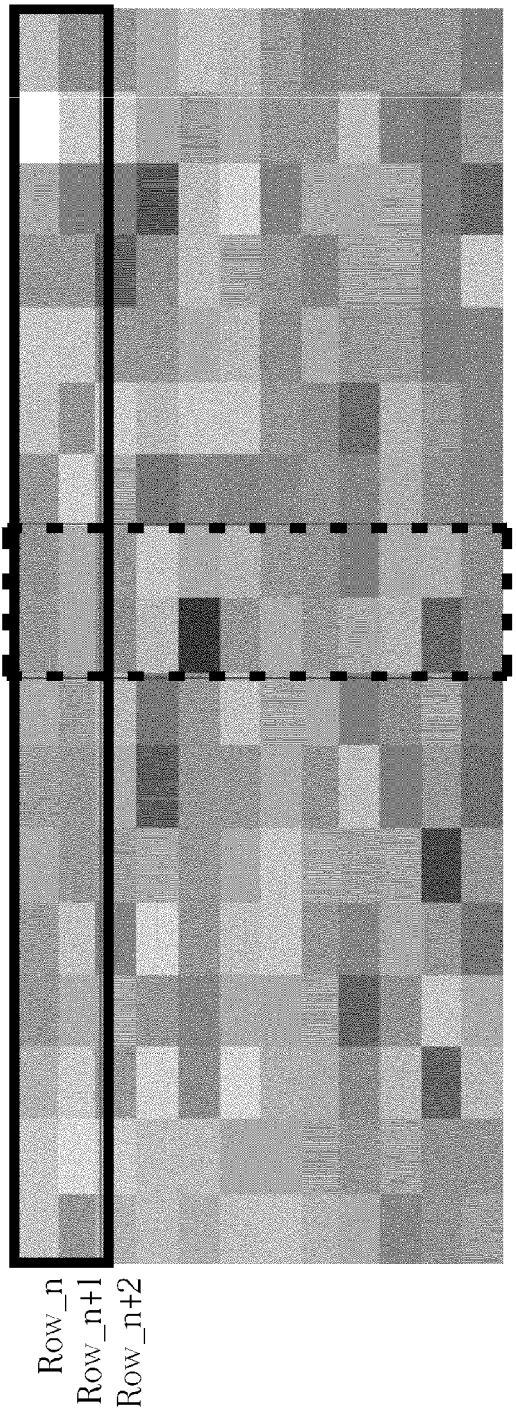
FIG. 11 is an image with FPN equal to 0.59% after applying the auto-zero circuitry of the present invention according to the same circuitry in FIG. 1.

From the above formula 2, it can be seen that ΔVout is proportional to ΔVlsfin. Because the second terminal 3143 of the second reset switch 3140 of the auto-zero circuitry 3000 is coupled to the Vclamp voltage source, and the auto-zero capacitor 3200 of the auto-zero circuitry 3000 is for stabilizing the auto-zero voltage, the output terminal of the op amp 3260 can be clamped to a fixed voltage. It means, the output voltage of each pixel can be clamped to a fixed voltage, and the FPN caused by the difference of "Vlsfin" between each pixel will produce very small offset voltages at the output terminal of the op amp 3260. As a result, the FPN can be reduced. Please refer to FIG. 11. FIG. 11 is an image with FPN=0.59% after applying the auto-zero circuitry 3000 of the present invention according to the same circuitry in FIG. 1 under the same light source and uniform illumination.

After the PGA 2500 finishes receiving data stored in the ping pong memory 2000, and sends out the output voltage at the output terminal of the op amp 3260, another column selection signal will be received. Then the PGA 2500 will transfer to receive the data from the next column, and starts a next data-reading process from the ping pong memory 2000 to the PGA 2500, and before that, self-resetting itself and the auto-zero circuitry 3000. After the PGA 2500 finishes receiving the data from all the odd columns in sequence, it returns back to the first even column, and starts receiving the data from all the even columns in sequence again. However, in order to increase the efficiency in data-receiving and data-transferring, the second portion 2520 of the ping pong memory 2000 is operated adversely. When a data-writing process from the 4-T pixel 1000 to the first portion 2020 of the ping pong memory 2000 is performed, a data-reading process from the second portion 2520 of the ping pong memory 2000 to the PGA 2500 is performed simultaneously; contrarily, when a data-writing process from the 4-T pixel 1000 to the second portion 2520 of the ping pong memory 2000 is performed, a data-reading process from the first portion 2020 of the ping pong memory 2000 to the PGA 2500 is performed simultaneously. The fourth, fifth, and sixth switches 2580, 2620, and 2600 of the second portion 2520 of the ping pong memory 2000 are corresponding to the first, second, and third switches 2080, 2120, and 2100 of the first portion 2020 of the ping pong memory 2000 respectively, and the third and fourth capacitors 2540 and 2560 of the second portion 2520 of the ping pong memory 2000 are corresponding to the first and second capacitors 2040 and 2060 of the first portion 2020 of the ping pong memory 2000 respectively. Generally speaking, the data received by the first portion 2020 of the ping pong memory 2000 is the data of odd columns of a frame, and the data received by the second portion 2520 of the ping pong memory 2000 is the data of even columns of a frame.

Figure 12:
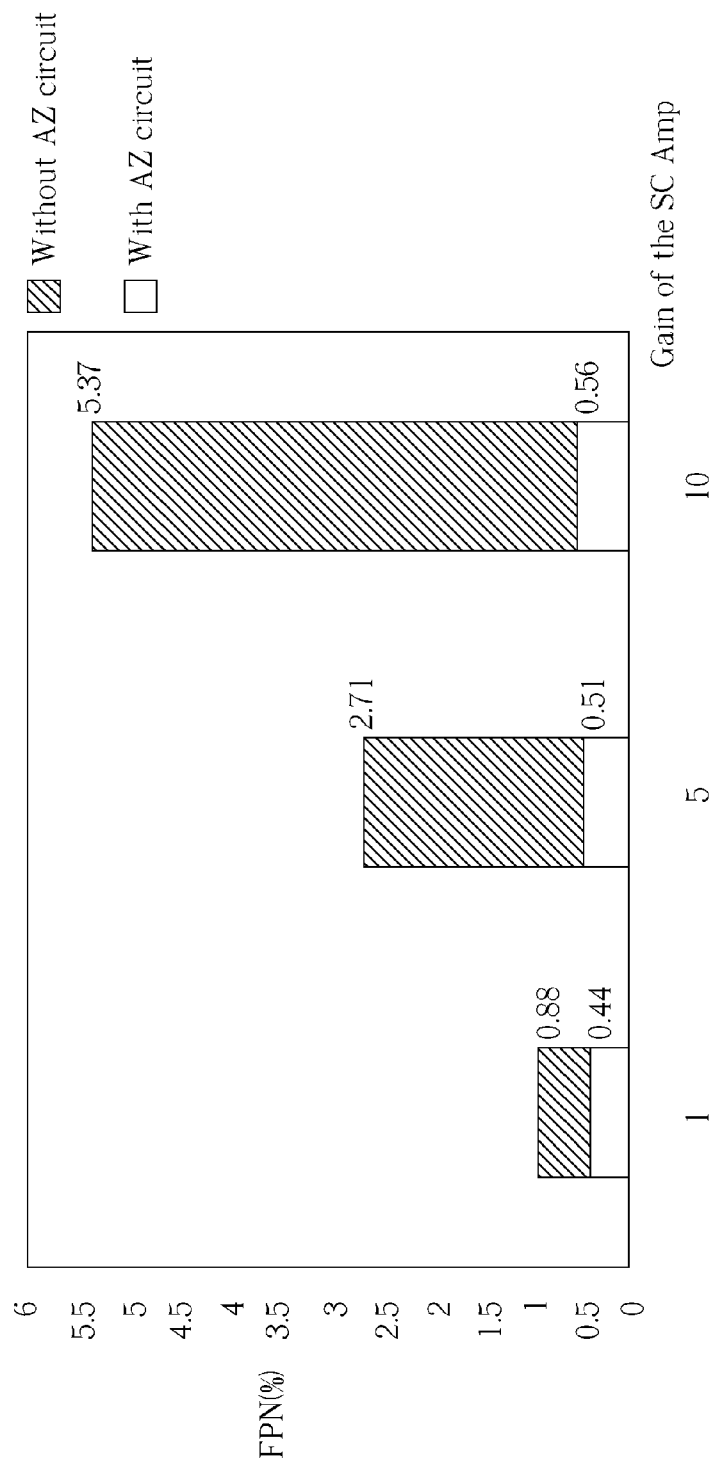
FIG. 12 is a bar chart of the test results of the image processing system with and without the auto-zero circuitry.

Please refer to FIG. 12. FIG. 12 is a bar chart of the test results of the image processing system 500 with and without the auto-zero circuitry 3000 of the present invention. The vertical axis in FIG. 12 represents the percentage of FPN, and the horizontal axis represents the amplified gain of the switched-capacitor amplifier (SC Amp) including the op amp 3260, the variable capacitor 3220, several related switches of the PGA 2500 and the auto-zero circuitry 3000, and the capacitors of the ping pong memory 2000. From FIG. 12, it can be seen that without the auto-zero circuitry 3000, the greater gain is associated with the greater FPN. However, when the auto-zero circuitry 3000 is added, the FPN is controlled around a small percentage regardless of the gain of the SC Amp.

In the prior art, when the speed of the image processing system increases, FPN increases drastically to more than 1% correspondingly. However, by adding the auto-zero circuitry of the present invention, when the speed of the image processing system increases, FPN increases slightly to only about 0.5% which is highly acceptable according to the industry standard. The speed of the image processing system can be speeded up through the complementary writing and reading processes performed by the first and second portions of the ping pong memory; however, without the auto-zero circuitry of the present invention, the ping pong memory cannot operate very fast due to the high FPN associated with the high speed, which is substantially removed by the auto-zero circuitry of the present invention.

To sum up, the present invention utilizes the auto-zero circuitry to form an open loop for the PGA, therefore removing the dc offset by clamping the output of each pixel to a fixed voltage. This will prevent FPN due to the difference between parameters of the image processing system. Thus, the present invention utilizes very simple and low-cost circuitry for preventing FPN effectively.

Those skilled in the art will readily observe that numerous modifications and alterations of the device and method may be made while retaining the teachings of the invention.

What is claimed is:

1. An image processing system comprising:
    a photodiode (for generating data according to received light);
    a 4-T (4-transistor) pixel coupled to the photodiode for transferring the data received from the photodiode, the 4-T transistor including a first portion of a linearized source follower;
    a second portion of the linearized source follower coupled to the first portion of the linearized source follower;
    a ping pong memory coupled to an output terminal of the second portion of the linearized source follower for transferring the data received from the photodiode through the 4-T pixel;
    a PGA (programmable gain amplifier) coupled to an output terminal of the ping pong memory for amplifying the data transferred from the output terminal of the ping pong memory; and
    auto-zero circuitry coupled to the PGA for eliminating a dc offset and noise of the PGA.

2. The image processing system of claim 1 wherein the 4-T pixel further includes:
    a reset switch coupled to a first voltage source; and
    a transmission switch coupled between the photodiode and the reset switch.

3. The image processing system of claim 2 wherein the first portion of a linearized source follower comprises:
    a first transistor having a first terminal coupled to the first voltage source, and a second terminal coupled to the reset switch and the transmission switch;
    a second transistor coupled to the first transistor in series.

4. The image processing system of claim 3 further comprising:
    a first current source coupled to the first voltage source; and
    a second current source coupled to the second voltage source;
    wherein the second portion of the linearized source follower comprises:
        a third transistor having two terminals coupled to the first current source and the output terminal of the second portion of the linearized source follower; and
        a fourth transistor having a first terminal coupled to the third transistor, a second terminal coupled to the first voltage source and the first current source, and a third terminal coupled to the second transistor and the second current source.

5. The image processing system of claim 1 wherein the ping pong memory comprises two portions, each comprising:
    a first switch coupled to the output terminal of the second portion of the linearized source follower;
    a first capacitor coupled to the first switch;
    a second capacitor having a first terminal coupled to the first capacitor and the first switch, and a second terminal coupled to a second voltage source;
    a second switch coupled between a first reference voltage source and the first capacitor; and
    a third switch having a first terminal coupled to the second switch and the first capacitor, and a second terminal coupled to the output terminal of the ping pong memory.

6. The image processing system of claim 1 wherein the PGA comprises:
    a first transmission switch coupled to the output terminal of the ping pong memory;
    a third reset switch coupled to the first transmission switch;
    a fourth reset switch coupled to the first transmission switch, and the third reset switch;
    a variable capacitor coupled in parallel with the fourth reset switch;
    an op amp having a non-inverting input terminal coupled to a second reference voltage source;
    a first selection switch coupled between an output terminal of the op amp and the fourth reset switch;
    a second selection switch coupled to a first current source; and
    a voltage mirror coupled to the third reset switch, the second selection switch, first and second current sources, an inverting input terminal of the op amp, and a second voltage source;
    wherein the first current source is coupled to a first voltage source, and the second current source is coupled to the second voltage source.

7. The image processing system of claim 6 wherein the auto-zero circuitry comprises:
    a second transmission switch coupled to the first transmission switch and the third reset switch;
    a first reset switch coupled to the first transmission switch and the third reset switch;
    an auto-zero capacitor coupled between the first reset switch and the second transmission switch;
    a second reset switch having a first terminal coupled to the second transmission switch and the auto-zero capacitor, and a second terminal coupled to a clamp voltage source; and
    a third transmission switch having a first terminal coupled to the third reset switch and the voltage mirror, and a second terminal coupled to the auto-zero capacitor and the first reset switch.

8. The image processing system of claim 6 wherein the voltage mirror comprises:
    a first PMOS transistor having a gate coupled to the first terminal of the third transmission switch, a drain coupled to the second voltage source, and a source coupled to the second selection switch; and a second PMOS transistor having a gate coupled to the inverting input terminal of the op amp, a drain coupled to the gate of the second PMOS transistor and the second current source, and a source coupled to the first current source and the second selection switch.

9. The image processing system of claim 6 wherein a positive power terminal of the op amp is coupled to the first voltage source.

10. An image processing method comprising:
resetting a 4-T pixel and a first portion of a ping pong memory;
writing data from a photodiode to the first portion of the ping pong memory through the 4-T pixel;
auto-zero circuitry resetting an output of a PGA (programmable gain amplifier) to generate a stable reference; and
writing the data from the first portion of the ping pong memory to the PGA.

11. The image processing method of claim 10 wherein writing the data from the photodiode to the first portion of the ping pong memory through the 4-T pixel is performed after the 4-T pixel and the first portion of the ping pong memory are reset, the auto-zero circuitry resetting the output of the PGA to generate the stable reference is performed after the data from the photodiode is written to the first portion of the ping pong memory, and writing the data from the first portion of the ping pong memory to the PGA is performed after the output of the PGA is reset.

12. The image processing method of claim 11 further comprising selecting the PGA while the auto-zero circuitry resetting the output of the PGA to generate the stable reference and writing the data from the first portion of the ping pong memory to the PGA.

13. The image processing method of claim 12 wherein selecting the PGA while the auto-zero circuitry resetting the output of the PGA to generate the stable reference and writing the data from the first portion of the ping pong memory to the PGA comprises:
switching on a first selection switch and a second selection switch of the PGA before the auto-zero circuitry resetting the output of the PGA; and
switching off the first and second selection switches of the PGA after writing the data from the first portion of the ping pong memory to the PGA.

14. The image processing method of claim 11 wherein resetting the 4-T pixel and the first portion of the ping pong memory comprises:
switching on a first switch of the first portion of the ping pong memory;
changing a first reset signal from a first potential to a second potential to switch on a reset switch of the 4-T pixel;
after the first switch of the first portion of the ping pong memory and the reset switch of the 4-T pixel are switched on, switching on a second switch of the first portion of the ping pong memory;
after the second switch of the first portion of the ping pong memory is switched on, changing the first reset signal from the second potential to the first potential to switch off the reset switch of the 4-T pixel; and
after the reset switch of the 4-T pixel is switched off, switching off the second switch of the first portion of the ping pong memory.

15. The image processing method of claim 11 wherein writing the data from the photodiode to the first portion of the ping pong memory through the 4-T pixel comprises:

changing a first transferring signal from a first potential to a second potential to switch on a transmission switch of the 4-T pixel so as to start a data-writing process from the 4-T pixel to the first portion of the ping pong memory;
after performing the data-writing process from the 4-T pixel to the first portion of the ping pong memory, changing the first transferring signal from the second potential to the first potential to switch off the transmission switch of the 4-T pixel, and switching off the first switch of the first portion of the ping pong memory; and
after switching off the first switch of the first portion of the ping pong memory, switching on a third switch of the first portion of the ping pong memory.

16. The image processing method of claim 11 wherein the auto-zero circuitry resetting the output of the PGA to generate the stable reference comprises:
changing a second reset signal from a first potential to a second potential to switch on first and second reset switches of the auto-zero circuitry, and third and fourth reset switches of the PGA to reset the PGA and the auto-zero circuitry; and
after the PGA and the auto-zero circuitry are reset, changing the second reset signal from the second potential to the first potential to switch off the first and second reset switches of the auto-zero circuitry, and the third and fourth reset switches of the PGA.

17. The image processing method of claim 11 wherein writing the data from the first portion of the ping pong memory to the PGA comprises:
changing a second transferring signal from a first potential to a second potential to switch on a first transmission switch of the PGA, and second and third transmission switches of the auto-zero circuitry so as to start a data-writing process from the first portion of the ping pong memory to the PGA; and
after performing the data-writing process from the first portion of the ping pong memory to the PGA, changing the second transferring signal from the second potential to the first potential to switch off the first transmission switch of the PGA, and the second and third transmission switches of the auto-zero circuitry.

18. An image processing method comprising:
switching on a first switch of a first portion of a ping pong memory;
changing a first reset signal from a first potential to a second potential to switch on a reset switch of a 4-T (4-transistor) pixel;
after the first switch of the first portion of the ping pong memory and the reset switch of the 4-T pixel are switched on, switching on a second switch of the first portion of the ping pong memory;
after the second switch of the first portion of the ping pong memory is switched on, changing the first reset signal from the second potential to the first potential to switch off the reset switch of the 4-T pixel;
after the reset switch of the 4-T pixel is switched off, switching off the second switch of the first portion of the ping pong memory;
changing a first transferring signal from the first potential to the second potential to switch on a transmission switch of the 4-T pixel so as to start a data-writing process from the 4-T pixel to the first portion of the ping pong memory;
after performing the data-writing process from the 4-T pixel to the first portion of the ping pong memory, changing the first transferring signal from the second potential to the first potential to switch off the transmission switch of the 4-T pixel, and switching off the first switch of the first portion of the ping pong memory;

after switching off the first switch of the first portion of the ping pong memory, switching on a third switch of the first portion of the ping pong memory;

switching on a first selection switch and a second selection switch of a PGA (programmable gain amplifier);

after the first selection switch and the second selection switch of the PGA are switched on, changing a second reset signal from the first potential to the second potential to switch on first and second reset switches of auto-zero circuitry, and third and fourth reset switches of the PGA to reset the PGA and the auto-zero circuitry;

after the PGA and the auto-zero circuitry are reset, changing the second reset signal from the second potential to the first potential to switch off the first and second reset switches of the auto-zero circuitry, and the third and fourth reset switches of the PGA;

after the first and second reset switches of the auto-zero circuitry, and the third and fourth reset switches of the PGA are switched off, changing a second transferring signal from the first potential to the second potential to switch on a first transmission switch of the PGA, and second and third transmission switches of the auto-zero circuitry so as to start a data-writing process from the first portion of the ping pong memory to the PGA;

after performing the data-writing process from the first portion of the ping pong memory to the PGA, changing the second transferring signal from the second potential to the first potential to switch off the first transmission switch of the PGA, and the second and third transmission switches of the auto-zero circuitry; and after the first transmission switch of the PGA, and the second and third transmission switches of the auto-zero circuitry are switched off, switching off the first and second selection switches of the PGA.

* * * * *